(12) United States Patent
Pressler et al.

(10) Patent No.: US 7,607,533 B2
(45) Date of Patent: Oct. 27, 2009

(54) CONVEYORS AND METHODS FOR NON-UNIFORMLY ACCELERATING CONVEYED ARTICLES

(75) Inventors: Eric M. Pressler, Mandeville, LA (US); Joseph M. DePaso, River Ridge, LA (US)

(73) Assignee: Laitram, L.L.C., Harahan, LA (US)

( * ) Notice: Subject to any disclaimer, the term of this patent is extended or adjusted under 35 U.S.C. 154(b) by 42 days.

(21) Appl. No.: 12/049,065

(22) Filed: Mar. 14, 2008

(65) Prior Publication Data

US 2009/0229953 A1  Sep. 17, 2009

(51) Int. Cl.
*B65G 15/00* (2006.01)
*B65G 21/22* (2006.01)

(52) U.S. Cl. .................... 198/779; 198/459.8
(58) Field of Classification Search ............... 198/779, 198/459.8
See application file for complete search history.

(56) References Cited

U.S. PATENT DOCUMENTS

| | | | |
|---|---|---|---|
| 2,531,292 A * | 11/1950 | Page ................. 198/458 |
| 3,568,823 A * | 3/1971 | Rettig et al. ............ 198/419.1 |
| 3,653,489 A * | 4/1972 | Tullis et al. ................ 198/779 |
| 4,039,074 A | 8/1977 | Maxted |
| 4,293,064 A * | 10/1981 | Robinson ................... 198/779 |
| 5,238,099 A | 8/1993 | Schroeder et al. |
| 5,238,121 A * | 8/1993 | Frisbie ....................... 209/539 |
| 5,769,204 A | 6/1998 | Okada et al. |
| 6,318,544 B1 | 11/2001 | O'Connor et al. |
| 6,401,936 B1 | 6/2002 | Isaacs et al. |
| 6,494,312 B2 | 12/2002 | Costanzo |
| 6,571,937 B1 | 6/2003 | Costanzo et al. |
| 6,758,323 B2 | 7/2004 | Costanzo |
| 6,968,941 B2 | 11/2005 | Fourney |
| 7,311,192 B2 | 12/2007 | Fourney |
| 7,344,018 B2 | 3/2008 | Costanzo et al. |
| 2007/0295582 A1 | 12/2007 | DePaso et al. |

* cited by examiner

*Primary Examiner*—Mark A Deuble
(74) *Attorney, Agent, or Firm*—James T. Cronvich

(57) ABSTRACT

Conveyors and methods for operating conveyors to accelerate laterally adjacent conveyed articles over different distances. The conveyors provide a conveying surface atop rollers in a conveyor belt. The belt rollers ride on a bearing surface underlying the belt on a carryway. As the belt advances, the rollers riding on the bearing surface rotate in a direction of rotation to accelerate conveyed articles along the belt in the direction of rotation. The bearing surface is shaped so that its length in the direction of belt travel varies across the width of the conveyor.

14 Claims, 4 Drawing Sheets

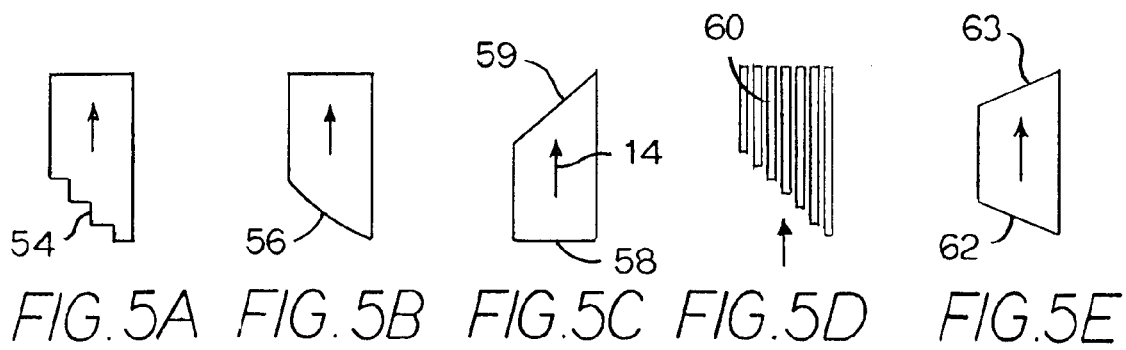

CONVEYORS AND METHODS FOR NON-UNIFORMLY ACCELERATING CONVEYED ARTICLES

BACKGROUND

The invention relates generally to power-driven conveyors and, more particularly, to belt conveyors having article-accelerating rollers arranged to rotate and propel articles atop the rollers in the direction of belt travel by rolling engagement of the rollers with bearing surfaces below the belt.

Depalletizing conveyors are used to break up a pallet layer consisting of a compact arrangement of tightly packed articles, such as boxes, and convey the articles stripped from the pallet layer downstream in a single file. Typically, the articles forming the pallet layer are arranged roughly in rows and columns of varying lengths and widths, especially when the articles are not shaped or oriented alike. Some depalletizers operate by receiving palletized articles row by row on parallel strands of flat-top chains running at a different speed from the speed of immediately upstream or downstream conveyors. Each of the strands can be run at a different speed, or each can have a different length, which may be achieved by staggering the entrance or exit ends of the parallel strands. By conveying the articles disposed across the width of the depalletizer at different speeds or at higher or lower speeds over different distances, the strands of chain cause the articles stripped from a row of the pallet layer to fan out and separate. But staggered chains or chains operated at different speeds require more shafts and other drive components.

SUMMARY

That shortcoming, as well as other shortcomings, may be overcome by a conveyor embodying features of the invention. The conveyor comprises at least one conveyor belt advancing upstream to downstream in a direction of belt travel. The belt has rollers that extend through the thickness of the belt. The rollers are arranged to rotate in a direction of rotation to accelerate articles conveyed atop the rollers in the direction of rotation. At least one bearing surface underlies the belt and provides tracks extending in the direction of belt travel along which the rollers roll as the belt advances. The bearing surface defines an acceleration zone that extends across the width of the conveyor between an upstream end and a downstream end. Articles carried atop the rollers are accelerated along the belt in the direction of rotation by the rotation of the rollers rolling along the tracks in the acceleration zone. The distance in the direction of belt travel between the upstream end and the downstream end of the acceleration zone varies across the width of the conveyor.

Another version of the conveyor embodying features of the invention comprises a conveyor belt having rollers that extend through the thickness of the belt. The rollers are arranged to rotate on axes perpendicular to the direction of belt travel. At least one bearing surface underlying the belt forms tracks extending in the direction of belt travel along a portion of the conveyor to define an article-acceleration zone in which the rollers rotate along the tracks on the bearing surface. The length of the zone in the direction of belt travel varies across the width of the conveyor. Articles at different positions across the width of the conveyor are accelerated over different distances as the conveyor belt advances.

According to another aspect of the invention, a method for operating a conveyor comprises: (a) advancing a conveyor having article-supporting rollers in a conveying direction; and (b) causing the rollers to rotate over different distances in a direction of rotation at different positions across the width of the conveyor as it advances.

BRIEF DESCRIPTION OF THE DRAWINGS

These features and aspects of the invention, as well as its advantages, are better understood by referring to the following description, appended claims, and accompanying drawings, in which:

FIGS. 5A-5E are top plan views of other bearing surfaces usable in a conveyor as in FIG. 1.

DETAILED DESCRIPTION

Figure 1:
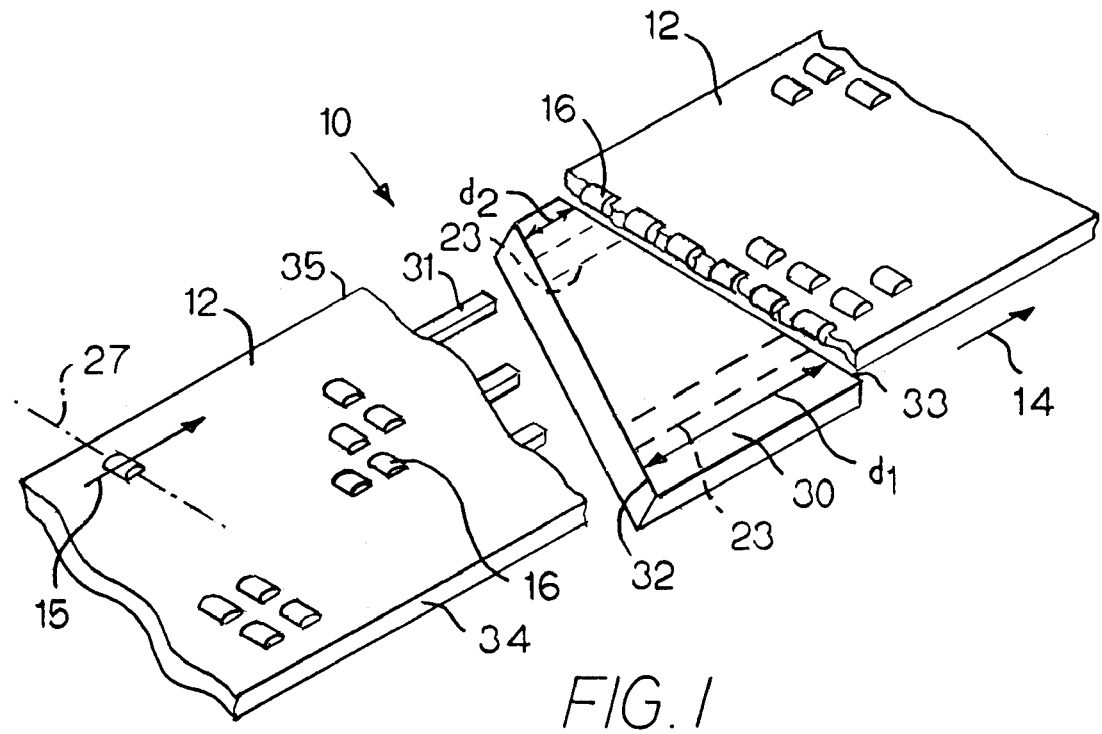
FIG. 1 is an isometric view, partly cut away, of a portion of a conveyor embodying features of the invention.
Figure 2:
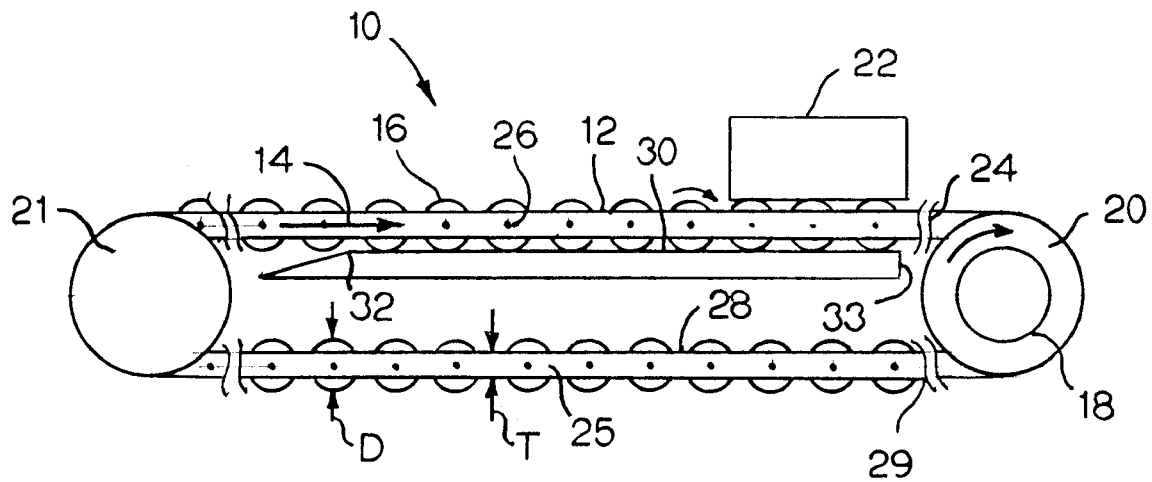
FIG. 2 is a side elevation view of a portion of a conveyor as in FIG. 1.

A conveyor embodying features of the invention is depicted in FIGS. 1 and 2. The conveyor 10 comprises an endless conveyor belt 12 advancing in a direction of belt travel 14. The conveyor belt has a plurality of rollers 16 generally arranged in rows and columns. The belt is driven by a motor 18 coupled to rotating belt-engaging drive elements 20, such as sprockets, drive drums, or pulleys, mounted on a shaft. Articles 22 are supported atop the rollers along an upper carryway portion 24 of the belt. The belt is trained around the drive elements 20 at a downstream end of the conveyor and rotatable idle elements 21 at an upstream end of the conveyor. The belt follows a lower returnway 25 from the drive elements to the idle elements.

The belt rollers 16 are preferably generally cylindrical with central bores that receive an axle 26 defining an axis 27 perpendicular to the direction of belt travel. The diameter D of the rollers exceeds the thickness T of the belt. Salient portions of the rollers protrude from belt cavities past inner and outer surfaces 28, 29 of the belt. One example of such a roller belt is the Series 400 0° Angled Roller™ modular plastic conveyor belt manufactured and sold by Intralox, L.L.C., of Harahan, La., U.S.A. Other realizations of roller belts include flat belts with rollers and parallel roller chains supporting the opposite ends of axles on which rollers are mounted for rotation. A bearing surface 30 underlies the belt along a portion of the carryway 24. Wearstrips 31 support the belt along its inner surface 28 between the columns of rollers and those portions of the carryway away from the bearing surface. The rollers ride along the bearing surface. Because the rollers are arranged in columns, each column rolls along a portion of the bearing surface that constitutes a roller path, or track 23, extending in the direction of belt travel. The bearing surface provides a number of parallel tracks-one for each column of rollers. As the belt advances along the carryway, the rollers' engagement with the bearing surface causes the rollers to rotate as viewed from above in a direction of rotation 15 parallel to the direction of belt travel. Articles 22 atop the rollers are accelerated along the top of the belt in the direction of belt travel at a speed of up to twice the belt speed, depending on how much the rollers slip on the bearing surfaces or on the bottoms of the conveyed articles. The region along the carryway in which the belt rollers engage bearing surfaces is defined as an article-acceleration zone of the conveyor because, in that zone, articles atop the rollers are accelerated forward.

The bearing surface 30 shown in FIG. 1 has a generally trapezoidal projection in a plan view. The upstream end 32 of the bearing surface varies, in this example, linearly, across the width of the conveyor. The upstream end is optionally tapered or sloped to provide a gradual entry of the rollers onto the bearing surface and avoid catching. The downstream end 33 of the bearing surface is perpendicular to the direction of belt travel. Consequently, the distance $d_1$ between the upstream and the downstream end at a first side 34 of the conveyor is greater than the distance $d_2$ at an opposite second side 35. The belt rollers at the first side 34 of the conveyor are activated over a longer stretch than the rollers at the second side 35. In this way, articles at the first side of the conveyor are propelled in the direction of roller rotation by the rollers over a longer distance than articles at the second side.

Figure 3:
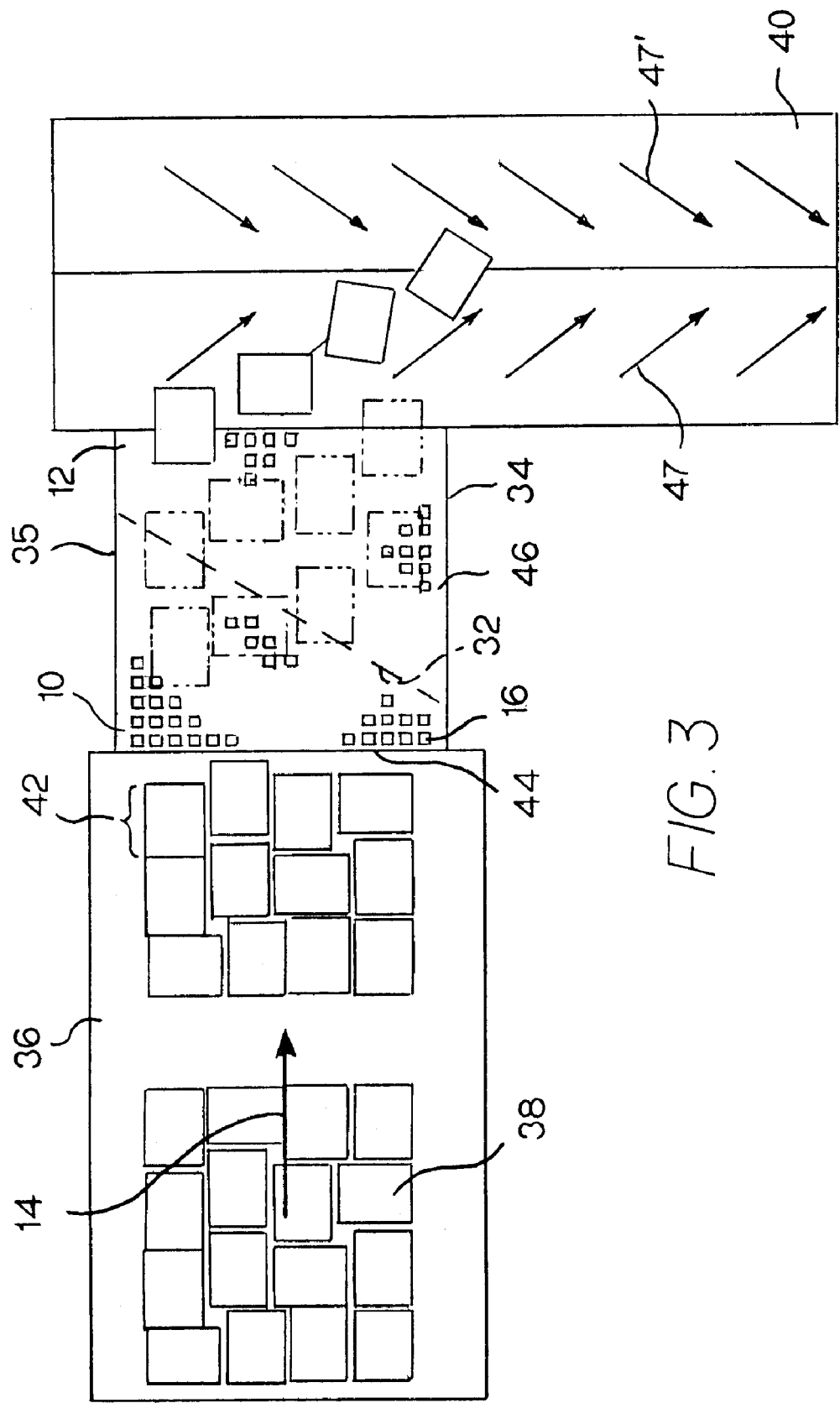
FIG. 3 is a top plan view of a conveyor as in FIGS. 1 and 2 used in a depalletizing application that feeds articles to a transverse centering conveyor.

One application of the conveyor of FIGS. 1 and 2 is shown in FIG. 3. The conveyor 10 is interposed between an infeed conveyor 36 transporting a pallet layer 38 forward and a centering conveyor 40 oriented perpendicular to the conveying direction 14 of the infeed conveyor 36 and the depalletizing conveyor 10. (The infeed conveyor may be jogged to insert a slight delay between the deliveries of consecutive rows of the pallet layer.) When a row 42 of articles reaches the depalletizing conveyor 10, the row is stripped off the infeed conveyor onto the rollers on the belt 12. Because the rollers at the infeed end 44 of the depalletizing conveyor are outside the article-acceleration zone 46, they are not rotated as the belt advances. When the articles reach the upstream end 32 of the acceleration zone, they are propelled forward atop the rotating rollers. The angled upstream end of the bearing surface causes the rollers at the first side 34 of the conveyor to rotate at a position farther upstream than the rollers at the second side 35. This staggered start to the rotation causes the articles at the first side of the conveyor to be accelerated sooner than those at the second side. The row of articles fans out more and more as it advances along the depalletizing conveyor so that the articles closer to the first side exit the downstream end of the belt before the articles toward the second side. The centering conveyor receives the fanned-out articles and centers them as they are conveyed single-file past the first side of the depalletizing conveyor. The centering conveyor may be realized as a roller conveyor or a belt conveyor with the rollers oriented to push articles in the directions indicated by arrows 47, 47'.

Figure 4:
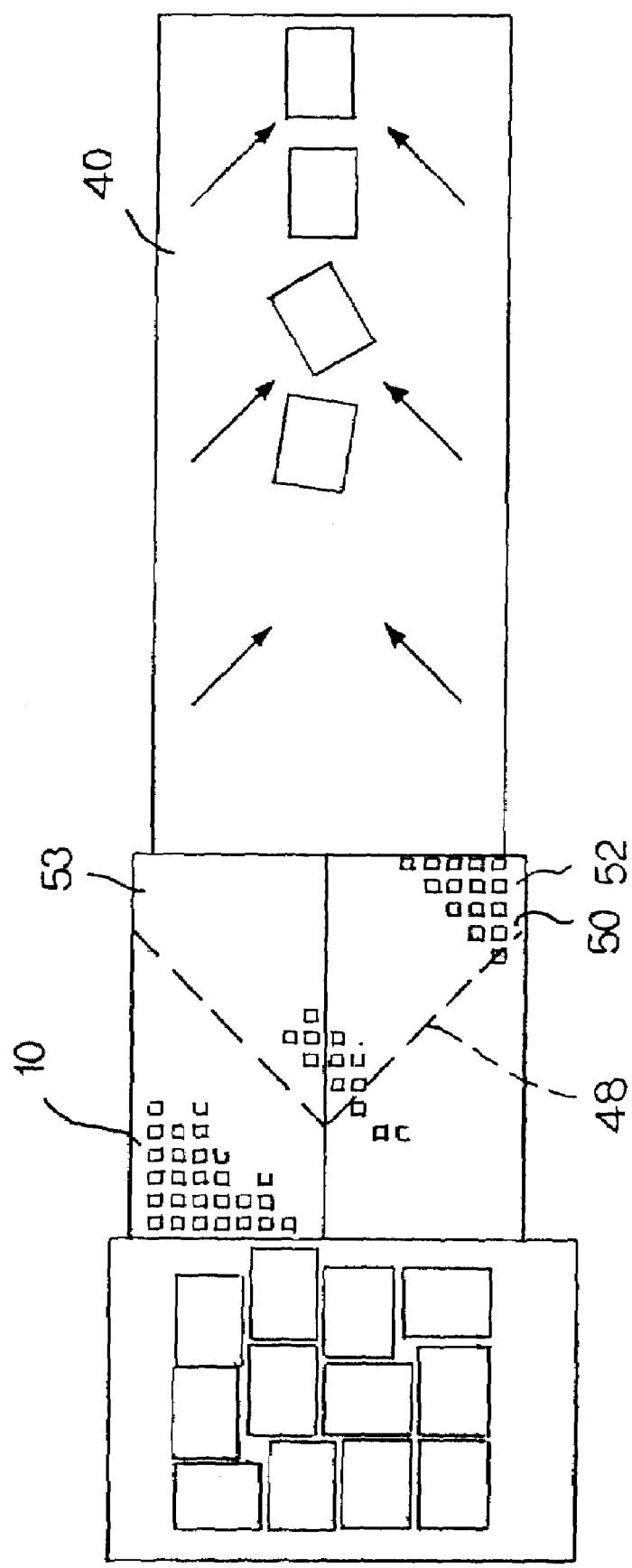
FIG. 4 is a top plan view of a conveyor as in FIGS. 1 and 2 used in a depalletizing application that feeds articles to an in-line centering conveyor.

Another depalletizing application is shown in FIG. 4. This application differs from that of FIG. 3 in that the centering conveyor 40 is in line with the depalletizing conveyor 10 and the upstream end 48 of the acceleration zone 50 is chevron-shaped to cause articles near the centerline of the conveyor to be accelerated earlier the articles at the sides. In this version, two roller belts 52, 53 are arranged side by side to form the depalletizing conveyor.

Other bearing surfaces that may be used in the conveyor of FIG. 1 are shown in FIGS. 5A-5E. The bearing surface of FIG. 5A is formed on a pan having a stepped upstream end 54 for a longer acceleration stretch along the right side referred to the drawing. The bearing surface of FIG. 5B has an arcuate upstream end 56 for a slightly different acceleration profile. The bearing surface of FIG. 5C has an upstream end 58 perpendicular to the direction of belt travel 14 and an angled downstream end 59. Like the other versions of bearing surfaces, this version provides a longer acceleration stretch along the right side. In FIG. 5D, individual wearstrips 60, arranged in parallel lanes to align with the columns of rollers in the belt and of varying lengths across the width of the conveyor, provide a bearing surface tracks for the rollers. The bearing surface of FIG. 5E has angled upstream and downstream ends 62, 63 to provide an acceleration effect similar to that of the other versions.

Although the invention has been described in detail with respect to a few preferred versions, other versions are possible. For example, the rollers shown in FIGS. 1-4 could be roller balls capable of omnidirectional rotation, but rotated by the underlying bearing surface in the direction of belt travel. As another example, a conveyor having an article-acceleration zone that varies in length across the conveyor's width may be used in applications other than depalletizing; for example, unscrambling a dense flow of articles. And the article-acceleration direction may be oblique or perpendicular to the direction of belt travel when, for example, belts with rollers arranged to rotate on axes oblique or parallel to the direction of belt travel are used. So, as these few examples suggest, the scope of the claims is not meant to be limited to the exemplary versions used to describe the invention.

What is claimed is:

1. A conveyor comprising:
   at least one conveyor belt advancing upstream to downstream in a direction of belt travel, the at least one conveyor belt having a plurality of rollers extending through the thickness of the belt and arranged to rotate in a direction of rotation to accelerate articles conveyed atop the rollers in the direction of rotation;
   at least one bearing surface underlying the at least one conveyor belt and providing tracks extending in the direction of belt travel along which the rollers roll as the belt advances to define an acceleration zone extending across the width of the conveyor between an upstream end and a downstream end, in which zone articles carried atop the rollers are accelerated along the belt in the direction of rotation by rotation of the rollers rolling along the tracks;
   wherein the distance in the direction of belt travel between the upstream end and the downstream end of the acceleration zone varies across the width of the conveyor.

2. A conveyor as in claim 1 wherein the direction of rotation is parallel to the direction of belt travel.

3. A conveyor as in claim 1 wherein the distance in the direction of belt travel between the upstream end and the downstream end of the acceleration zone varies linearly across the width of the conveyor.

4. A conveyor as in claim 1 wherein the upstream end of the acceleration zone varies linearly across the width of the conveyor.

5. A conveyor as in claim 1 wherein the downstream end of the acceleration zone extends across the width of the conveyor along a line perpendicular to the direction of belt travel.

6. A conveyor as in claim 1 wherein the rollers rotate on axles defining axes perpendicular to the direction of belt travel.

7. A conveyor as in claim 1 wherein the rollers are roller balls free to rotate omnidirectionally.

8. A conveyor as in claim 1 wherein the at least one conveyor belt comprises at least two conveyor belts arranged side by side across the width of the conveyor.

9. A conveyor comprising:
   a conveyor belt advancing in a direction of belt travel and having rollers extending through the thickness of the belt and arranged to rotate on axes perpendicular to the direction of belt travel;
   at least one bearing surface underlying the conveyor belt and forming tracks extending in the direction of belt travel along a portion of the conveyor to define an article-acceleration zone in which the rollers rotate as they ride along the tracks on the bearing surface, wherein the length of the article-acceleration zone in the direction of belt travel varies across the width of the conveyor to accelerate articles at different positions across the width of the conveyor over different distances in the direction of belt travel as the conveyor belt advances.

10. A conveyor as in claim 9 wherein the acceleration zone is longer at a first side of the conveyor belt than at a second side of the conveyor belt.

11. A conveyor as in claim 10 further comprising a second conveyor arranged perpendicular to the conveyor belt in a position to receive articles exiting the downstream end of the conveyor belt and convey the articles past the first side of the conveyor belt in a conveying direction perpendicular to the direction of belt travel.

12. A conveyor as in claim 9 further comprising a centering conveyor disposed at the downstream end of the conveyor belt to receive articles exiting the downstream end of the conveyor belt and convey them further in the direction of belt travel.

13. A method for operating a conveyor, comprising:
advancing a conveyor having article-supporting rollers in a conveying direction;
causing the rollers to rotate over different distances in a direction of rotation at different positions across the width of the conveyor as the conveyor advances.

14. The method of claim 13 wherein causing the rollers to rotate over different distances in a direction of rotation at different positions across the width of the conveyor as the conveyor advances comprises activating the rollers from below the conveyor with a bearing surface whose length in the conveying direction varies across the width of the conveyor.

* * * * *